Jan. 4, 1944. R. W. DE LANCEY 2,338,319
FUEL FEED CONTROL
Filed Aug. 2, 1940
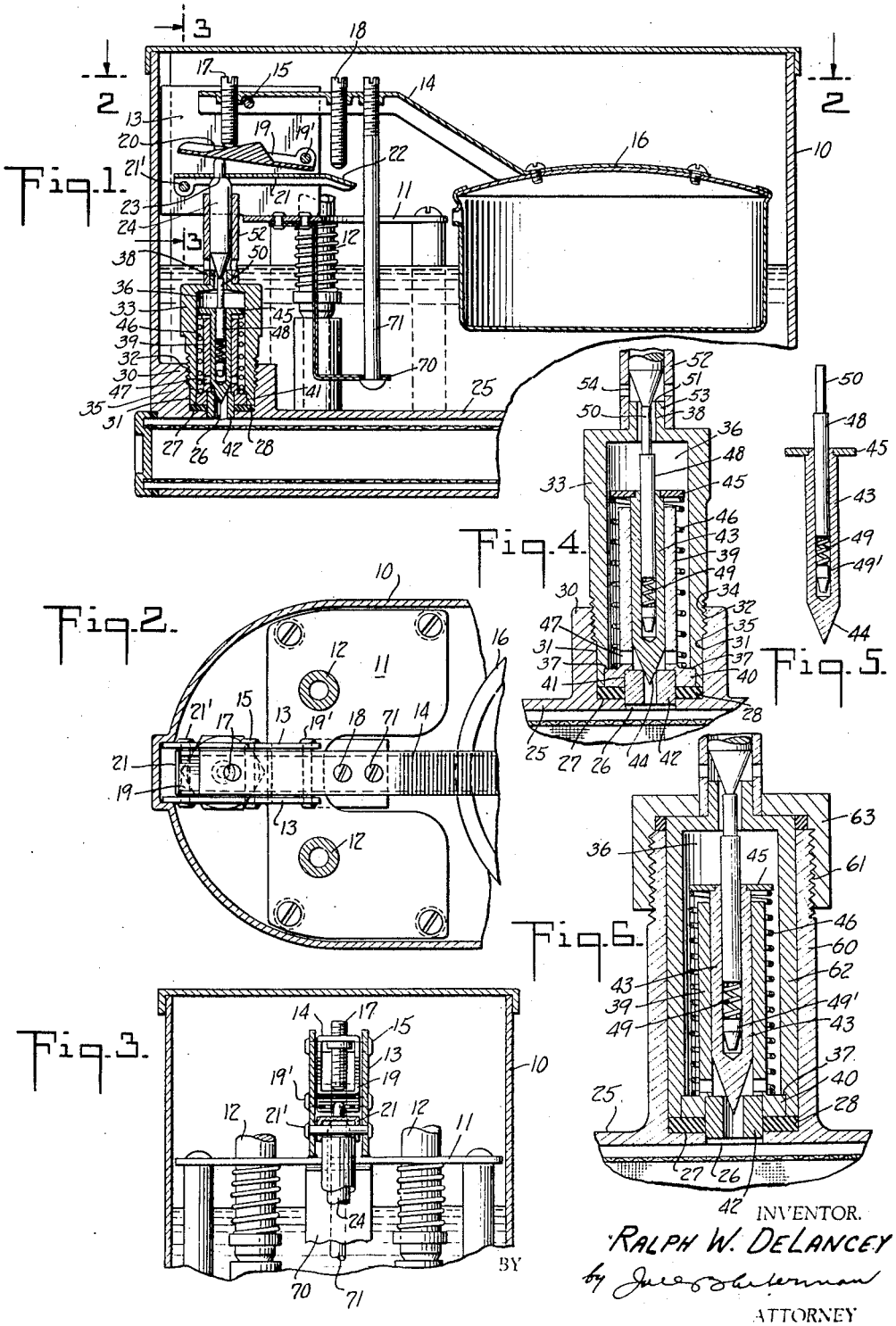
INVENTOR.
RALPH W. DeLANCEY
BY
ATTORNEY Patented Jan. 4, 1944

2,338,319

UNITED STATES PATENT OFFICE 2,338,319

FUEL FEED CONTROL

Ralph W. De Lancey, Meriden, Conn., assignor to The Miller Company, Meriden, Conn., a corporation of Connecticut Application August 2, 1940, Serial No. 349,844

28 Claims. (Cl. 137—68)

The present invention relates to fuel feed controls, and is more particularly directed toward a constant level valve controlled by a variably submerged liquid displacement element, such as a float, and adapted for use in the supply line of oil burners and the like.

The present invention contemplates improvements in valve mechanism for controlling the flow of liquid into an intermediate reservoir in the fuel supply line for an oil burner, according to which the liquid is normally maintained at a predetermined level by a float controlled service valve. This service valve normally acts to stop the flow of liquid into the reservoir when the liquid has reached the desired height. Should leakage occur at a rate more rapid than the rate at which the fuel is being used, the liquid displacement element, or float will continue to rise and according to the present invention the continued rise of the same operates a second or emergency valve holding it in closed position due to the buoyancy of the element in the liquid at greater height than normal.

According to the present invention the liquid displacement element, or float can lower from the emergency closing position to the normal operating position upon withdrawal of liquid from the reservoir, and as soon as it lowers a sufficient amount the service valve is automatically opened so as to restore the valve mechanism to normal operation.

An object of the present invention is to provide valve mechanism for such control of the liquid flow wherein the valve seats are fixed and face upwardly and cooperate with downwardly movable valve members or valve stems. The valve members are normally spaced farther apart than the seats and movable downwardly by the rise of the float mechanism so that the lower or service valve member seats first, and, should the rise of the float not be checked by the service valve, a spring between the two valve members yields and allows the upper or emergency valve member to seat. The two valve members are normally held off their seats when not under control of the float by a spring which lifts them up.

The valve mechanism having the upwardly facing seats in series and the cooperative downwardly closing valve members may be used in locations where there is no objection to keeping the line to the main fuel supply source open should the fuel be drained from the reservoir, as, for example, when a non-sinkable liquid displacement element is employed, and in this case the connection between the valve mechanisms per se and the liquid displacement element may be direct acting.

The valve mechanism of the present invention is also suited for use in constant level valves of the type in which it is desired to effect a closing action of the valve stem when the liquid displacement element, or float lowers below a predetermined position below the normal valve opening position, as, for example, by depletion of the fuel supply, or by sinkage. Where such operations are desired, the present invention contemplates the provision of interconnections whereby the valve stems may be actuated to secure normal closing of the service valve, closing of emergency valve, if there be excess fuel flow into the reservoir, and emergency valve closure should the fuel be drained too low, or the float sink.

Liquid fuel has a comparatively large thermal coefficient expansion. The constant level valve is usually adjusted for a measured flow at normal room temperature. Should the temperature lower naturally, a condition which would call for more fuel consumption, the flow is diminished because of the change in height at which the mechanism becomes balanced. The denser the oil, the higher the float is to operate the service valve for the same oil level, and hence the head of oil maintained on the outlet valve is lower. This, combined with the reduction of viscosity with temperature has been found to result in considerable slowing up of fuel consumption in cold weather.

The present invention contemplates the provision of thermally responsive means for imposing a variable load on the liquid level responsive mechanism, increasing the load as the oil temperature lowers.

Other and further objects of the invention will appear as the description proceeds.

The accompanying drawing shows, for purposes of illustrating the present invention, one of the many embodiments in which the invention may take form, together with modifications of certain parts, it being understood that the drawing is illustrative of the invention rather than limiting the same.

In the drawing:

Figure 1 is a sectional view through a constant level valve mechanism;

Figure 2 is a top plan view of the mechanism of Figure 1 with parts broken away;

Figure 3 is a cross section on the line 3—3 of Figure 1;

Figure 4 is a sectional view on the inlet valve mechanism of Figure 1 at an enlarged scale, the lower or service valve member being seated and the upper one being off its seat;

Fig. 5 is a fragmentary sectional view, and

Figure 6 is a view similar to Figure 4 showing a slightly modified form of construction and valve members both in open position.

The reservoir of a constant level valve is indicated at 10. A bridge 11, preferably a die casting, extends across the reservoir, supports one or more outlet valves fragmentarily illustrated at 12 and has upwardly extending fins 13, 13 in which the float arm 14 is carried by a pivot pin 15. This float arm carries a float 16 which may be totally closed or have an opening, as indicated in the drawing. The float arm carries an adjustable screw 17, located close to the pin 15, and another screw 18 located between the pin 15 and the float. Each of these screws is adjustable for purposes to be described.

The fins 13 carry an arm 19 pivoted at 19' which has an inclined surface 20 cooperable with the lower end of the pin 17 to press the arm 19 down when the float rises. The fins 13 carry a lever 21 pivoted at 21' and having a downwardly bent end 22 engageable by the screw 18 when the float lowers below a predetermined level. The lever 21 rests on shoulder 23 of a valve stem 24 whose upper end supports the lever 19. Where direct action between the float mechanism per se and the valve mechanism per se is desired, the screw 17 would be directly over the top of the pin 24 and bear on it. The pin 17 could then be shorter and the levers 19 and 21 omitted.

The bottom wall 25 of the reservoir has an inlet opening, indicated at 26, directly below the valve stem 24, and this inlet opening is surrounded by a flat annular surface 27 adapted to form a seat for a gasket 28 suitable for use with oil. About the annular seat 27 is an upwardly extending tubular element 30 which, as shown in Figures 1 and 4, has a lower cylindrical portion 31 and an upper internally threaded portion 32.

A body member 33 is threaded, as indicated at 34, to fit the threads 32 of the tubular element and has a cylindrical lower end 35 to closely fit the cylindrical bore in the tubular element.

The lengths of the cylindrical portions 31 and 35 are such that the lower part of the body member is below the threads on the tubular element before the upper threads start to mesh. This makes it impossible for any foreign matter, such as chips, to drop down and interfere with the making of an oil tight fit.

The body member 33 has a downwardly opening chamber 36 with a downwardly facing shoulder 37 near the bottom and an upwardly extending passageway 38 at the top. The chamber 36 is adapted to receive the service valve mechanism. As shown in the drawing this service valve mechanism has a tubular valve stem guide 39 having a flange 40 at the lower end to fit against the shoulder 37 on the body member. This valve stem guide is counterbored from below, as indicated at 41, to receive the seat forming member 42 of the service valve. This seat forming member may be accurately machined, polished and inspected before it is forced into the counterbore. The tubular guide 39 receives a valve stem 43 having a conical lower end 44 and a reduced upper end to receive a washer 45 which forms a flange. A coiled spring 46 is placed between the flange 45 and the flange 40 on the guide, and this spring acts to lift the service valve member off the seat. It is easily compressible to permit seating the valve member 43. Oil flowing up past the service valve seat 42 passes out through ports 47 in the tubular guide 39, up through the chamber 36 and out through the upper passage 38.

The service valve member 43 is counterbored from above to receive a plunger 48, a comparatively stiff coiled spring 49 and a plug-like element 49'. The upper end of the plunger is of reduced diameter, as indicated at 50, and extends up through the passageway 38.

The outlet passage 38 in the body member 33 is surrounded by an emergency valve seat 51. This valve seat may be accurately machined, polished and inspected before the upper tubular valve stem guide 52 is forced into place on the reduced upper end 53 of the body member. The guide 52 has outlet ports 54 just above the valve seat 51 and receives the upper or emergency valve stem 24, the upper end of which is adapted to be contacted by the lower end of the adjusting screw 17 when the float approaches the level at which the service valve is to close.

In assembling the valve the plug 49' is pushed down into the counterbore and then the spring pushed in and the plunger 48 started down the counterbore. The plug 49' has a close fit, but can slide if sufficient pressure is developed. The plunger 48 is then pushed all the way down as far as it will ever go in service by seating the upper valve member. This will compress the spring 49 and push the plug 49' as far as it will ever go in practice. This arrangement takes care of the accumulated discrepancies in dimension in the manufacture of the parts and makes it possible to secure the desired small opening movement of the service valve (in the neighborhood of $5/1000$ of an inch) without necessitating difficult manufacturing tolerances of the parts.

In the arrangement shown in Figure 6 the valve mechanism is the same as that previously described in detail but is shown in open position and the same reference characters are applied as far as possible. The tubular element 60 is externally threaded, as indicated at 61, and the body member 62 is secured in place by a threaded cap 63.

The bridge supports a bi-metallic thermostat 70 which extends down into the fuel so as to be at the temperature of the fuel in the reservoir. This may be considerably cooler than the surrounding region, if the fuel comes from an exposed or outside storage tank. The end of the thermostat 70 is connected by a screw 71 with the float arm 14. In the arrangement shown, the cooling of the liquid will cause the bi-metallic thermal element to swing to the left and tend to load the float so that it will require a greater depth of liquid to close the valve.

The bridge 11 and parts carried thereby may be a preassembled unit. After this unit has been secured in the reservoir the screws 17 and 71 are adjusted so that the lower valve is closed when the fuel is at the proper level and temperature. Should the float lower, the lower end of screw 17 will move upwardly and to the left away from the incline 20 (Figure 1) so that the spring 46 may raise the lower valve stem 43 off its seat and allow liquid to flow into the reservoir. This will raise the float moving the lower end of the screw 17 downwardly and to the right, bringing it against the inclined surface 20. Nearly all the downward component of force available from the screw 17 is transmitted directly to the upper valve stem and through it to the lower valve stem. The pivot for the lever absorbs the horizontal component and the remaining vertical component. The sliding action along the incline takes place with very little friction. Owing to the relation of parts the closure of the lower valve with adequate pressure for normal operation can be had with very small float movement. Should the oil continue to flow in, the float will be more and more submerged developing greater forces which will cause the lower end of the screw 17 to travel along the inclined surface 20, swinging the lever about its pivot and pressing the valve stem down, so as to develop an increased pressure on the upper valve stem and force the upper valve stem to closed position. When the float lowers below the usual working range the screw 18 comes against the sloping end 22 of the lever 21 pressing it down and closing the valves.

It will be obvious that the inlet valve mechanism just described may be used with various forms of liquid level responsive mechanism designed to provide a downward force against the top of the upper valve stem, and that the thermal compensator is capable of general application in constant level valves irrespective of the type of valve mechanism or float mechanism employed.

It is obvious that the invention may be embodied in many forms and constructions within the scope of the claims and I wish it to be understood that the particular form shown is but one of the many forms. Various modications and changes being possible, I do not otherwise limit myself in any way with respect thereto.

What is claimed is:

1. In a device for controlling liquid flow, a liquid holding reservoir having in the bottom wall thereof an inlet passage including an aperture, an annular seat about the aperture, and an upwardly extending tubular element above the seat, a washer on the annular seat, a body member receivable in the tubular element and having its lower end bearing on the washer, threaded means for forcing the body member against the washer to secure a liquid tight joint, the body member having a downwardly opening chamber to receive liquid passing up through the aperture in the bottom wall of the receptacle and a small diameter outlet opening at the top, an upwardly facing valve seat about said outlet opening, a valve stem guide secured to the body member about said seat, and a downwardly movable valve stem cooperable with said valve seat.

2. In a device for controlling liquid flow, a liquid holding reservoir having in the bottom wall thereof an inlet passage including an aperture, an annular seat about the aperture, and an upwardly extending tubular element having a cylindrical bore above the seat and internally threaded above the cylindrical bore, a washer on the annular seat, a body member receivable in the tubular element and having its lower end bearing on the washer, a cylindrical portion fitting the bore and threaded into the tubular element for forcing the body member against the washer to secure a liquid tight joint, the body member having a downwardly opening chamber to receive liquid passing up through the aperture in the bottom wall of the receptacle and a small diameter outlet opening at the top, and an upwardly facing valve seat about said outlet opening.

3. In a device for controlling liquid flow, a liquid holding reservoir having in the bottom wall thereof an inlet passage including an aperture, an annular seat about the aperture, and an upwardly extending tubular element having a cylindrical bore above the seat and internally threaded above the cylindrical bore, a washer on the annular seat, a body member receivable in the tubular element and having its lower end bearing on the washer, a cylindrical portion fitting the bore and threaded into the tubular element for forcing the body member against the washer to secure a liquid tight joint, the body member having a downwardly opening chamber to receive liquid passing up through the aperture in the bottom wall of the receptacle and a small diameter outlet opening at the top, an upwardly facing valve seat about said outlet opening, a valve stem guide secured to the body member about said seat, and a downwardly movable valve stem cooperable with said valve seat.

4. In a device for controlling liquid flow, a liquid holding reservoir having in the bottom wall thereof an inlet passage including an aperture, an annular seat about the aperture, and an upwardy extending tubular element above the seat, a washer on the annular seat, a body member receivable in the tubular element and having its lower end bearing on the washer, threaded means for forcing the body member against the washer to secure a liquid tight joint, the body member having a downwardly opening chamber to receive liquid passing up through the aperture in the bottom wall of the receptacle, a downwardly facing shoulder near the bottom of the chamber, and an outlet opening at the top, an inner concentric tubular element having a flange clamped between the shoulder and the washer, an upwardly facing annular valve seat near the bottom thereof, outlet openings above the flange, and an outer wall spaced from the chamber wall, a valve stem slidably carried in the tubular element and cooperable with the valve seat, the valve stem being counterbored from the top and having an upper flange extending beyond the top of the tubular element, a coiled spring interposed between the shoulder and flange and acting to normally hold the valve stem off its seat, a plunger extending down through the outlet opening in the body member and into the counterbore in the valve stem, and a cushioning spring below the plunger in the counterbore.

5. In a device for controlling liquid flow, a liquid holding reservoir having in the bottom wall thereof an inlet passage including an aperture, an annular seat about the aperture, and an upwardly extending tubular element above the seat, a washer on the annular seat, a body member receivable in the tubular element and having its lower end bearing on the washer, threaded means for forcing the body member against the washer to secure a liquid tight joint, the body member having a downwardly opening chamber to receive liquid passing up through the aperture in the bottom wall of the receptable, a downwardly facing shoulder near the bottom of the chamber, and an outlet opening at the top, an inner concentric tubular element having a flange clamped between the shoulder and the washer, an upwardly facing annular valve seat near the bottom thereof, outlet openings above the flange, and an outer wall spaced from the chamber wall, a valve stem slidably carried in the tubular element and cooperable with the valve seat, the valve stem being counterbored from the top and having an upper flange extending beyond the top of the tubular element, a coiled spring interposed between the shoulder and flange and acting to normally hold the valve stem off its seat, a plunger extending down through the outlet opening in the body member and into the counterbore in the valve stem, a cushioning spring below the plunger in the counterbore, the body member having an upwardly facing valve seat about said outlet opening, a valve stem guide secured to the body member about said seat, and an upper downwardly movable valve stem cooperable with the upper valve seat and cooperable with the plunger to push the lower valve stem onto its seat before the upper stem is seated onto its seat.

6. In a device for controlling liquid flow, a liquid holding reservoir having in the bottom wall thereof an inlet passage including an aperture, an annular seat about the aperture, and an upwardly extending tubular element having a cylindrical bore above the seat and internally threaded above the cylindrical bore, a washer on the annular seat, a body member receivable in the tubular element and having its lower end bearing on the washer, a cylindrical portion fitting the bore and threaded into the tubular element for forcing the body member against the washer to secure a liquid tight joint, the body member having a downwardly opening chamber to receive liquid passing up through the aperture in the bottom wall of the receptacle, a downwardly facing shoulder near the bottom of the chamber, and an outlet opening at the top, an inner concentric tubular element having a flange clamped between the shoulder and the washer, an upwardly facing annular valve seat near the bottom thereof, outlet openings above the flange, and an outer wall spaced from the chamber wall, a valve stem slidably carried in the tubular element and cooperable with the valve seat, the valve stem being counterbored from the top and having an upper flange extending beyond the top of the tubular element, a coiled spring interposed between the shoulder and flange and acting to normally hold the valve stem off its seat, a plunger extending down through the outlet opening in the body member and into the counterbore in the valve stem, and a cushioning spring below the plunger in the counterbore.

7. In a device for controlling liquid flow, a liquid holding reservoir having in the bottom wall thereof an inlet passage including an aperture, an annular seat about the aperture, and an upwardly extending tubular element above the seat, a washer on the annular seat, a body member receivable in the tubular element and having its lower end bearing on the washer, threaded means for forcing the body member against the washer to secure a liquid tight joint, the body member having a downwardly opening chamber to receive liquid passing up through the aperture in the bottom wall of the receptacle and a small diameter outlet opening at the top, a fixed, upwardly facing annular valve seat at the bottom of the chamber, a cooperative valve stem, a spring operating on the valve stem to normally keep it off its seat, a plunger having a resilient connection with the valve stem and adapted to push it down against its seat and then compress the resilient connection, the plunger extending through the outlet opening, an upwardly facing valve seat about said outlet opening, a valve stem guide secured to the body member about said seat, and a second downwardly movable valve stem cooperable with said valve seat, and engageable with the plunger to depress it and close the lower valve before it closes the upper valve.

8. In a device for controlling liquid flow, a liquid holding reservoir having in the bottom wall thereof an inlet passage including an aperture, an annular seat about the aperture, and an upwardly extending tubular element above the seat, a washer on the annular seat, a body member receivable in the tubular element and having its lower end bearing on the washer, threaded means for forcing the body member against the washer to secure a liquid tight joint, the body member having a downwardly opening chamber to receive liquid passing up through the aperture in the bottom wall of the receptacle and a small diameter outlet opening at the top, an upwardly facing valve seat about said outlet opening, a valve stem guide secured to the body member about said seat, a downwardly movable valve stem cooperable with said valve seat, a second spring supported valve stem below the first, a plunger carried by the second valve stem, a second spring carried by the second valve stem and holding the plunger against the first valve stem, and a second upwardly facing valve seat from which the second valve stem is normally spaced, the spring support for the second valve stem yielding to allow seating of the second valve stem before the first valve stem is seated.

9. A device for controlling the flow of liquids, comprising a reservoir having an inlet passage including a lower, upwardly facing valve seat, an upper, upwardly facing valve seat, a chamber forming wall whereby liquid entering the reservoir must pass upwardly by both valve seats, a tubular guide extending upwardly from the lower valve seat, spaced from the chamber wall and having a port opening into said space, a lower valve stem slidable in the guide, a relatively weak coiled spring in said space acting on the lower valve stem to hold it off the seat, an upper valve stem cooperable with the upper valve seat, a plunger and plunger lifting spring carried in the lower valve seat and holding the plunger against the upper valve stem.

10. A device for controlling the flow of liquid comprising a reservoir having an inlet passage including a lower, upwardly facing valve seat, an upper, upwardly facing valve seat, a chamber forming wall whereby liquid entering the reservoir must pass upwardly by both valve seats, vertically guided upper and lower valve stems one for each seat, a plunger and compression spring coupling the two valve stems together, and a spring acting on the lower valve stem to lift it off its seat and through the compression spring and plunger to hold the upper valve stem off its seat, whereby a clear passage for flow is maintained, and means for moving the upper valve stem and plunger downwardly to compress both springs and move the lower valve stem onto its seat and to thereafter move the upper stem against its seat.

11. In a device for controlling the flow of liquids, a reservoir having an inlet passage with two fixed upwardly facing valve seats in series one above the other, two downwardly facing valve members one above the other, a spring and plunger interconnecting the members so that they have a normal spacing greater than that of the valve seats, the spring being compressible so that they can have the same spacing as the valve seats whereby they may be seated on the valve seats in sequence and be unseated in reverse sequence, a second spring acting on the lower valve member and tending to unseat both valve members, means responsive to the level of liquid in the reservoir and including a variably submerged liquid displacement element in the reservoir, for applying a downward pressure on the upper valve member in increasing amounts as the liquid level rises to a predetermined high elevation to first push the upper valve member, the plunger, the first spring and the lower valve member downwardly to compress the second spring and bring the lower valve member against the seat and to then push the upper valve member and plunger downwardly to compress the first spring and bring the upper valve member against the upper seat, said means including a separable connection between the upper valve member and the liquid displacement element so that the extent of opening of the valve members is controlled solely by the springs when the liquid level is below that corresponding with the said first application of pressure during the rise of liquid level.

12. A device for controlling the flow of liquids into a reservoir having a hole in the bottom thereof, comprising a valve assembly secured above said bottom opening and having two fixed, axially aligned, upwardly facing valve seats in series and through which liquid passes upwardly, two valve stems, one for each seat, the lower valve stem having an upwardly opening counterbore, a fixed guide for the lower stem, a fixed guide for the upper valve stem, a spring in the counterbore, a plunger resting on the spring and extending to the upper valve stem, and a second spring acting on the lower valve stem to normally hold it off its seat and the upper stem off its seat, the second spring being yieldable to permit seating of the lower valve stem before the upper one is seated, the first spring then yielding to permit the upper stem to be seated.

13. A device for controlling the flow of liquids into a reservoir having a hole in the bottom thereof, comprising a valve assembly secured above said bottom opening and having two fixed, axially aligned, valve seats in series in a passage and facing in the direction of liquid travel, an externally accessible valve stem cooperative with the second seat in said passage, a second enclosed valve stem cooperative with the first seat in the passage, a yieldable spring connection between the two valve stems to permit overtravel, and a second spring for holding both valve stems off their seats, the second spring being softer than the spring connection so that it may yield and allow the seating of the first valve stem before the second.

14. A device for controlling the flow of liquids into a reservoir having a hole in the bottom thereof, comprising a valve assembly secured above said bottom opening and having two fixed valve seats facing in the same direction and spaced along an axis and two fixed valve stem guides, two valve stems one for each seat, a plunger slidably carried in a counterbore in one valve stem and engageable with the other, a spring in the counterbore and urging the plunger toward the said other valve stem and compressible when the first is seated to provide overtravel for the second, and a second spring acting on the first valve stem to normally hold both stems off their seats.

15. A device as in claim 14, having a plug in the counterbore below the first spring and frictionally engaging the walls thereof, the plug being movable to position when the second valve stem is initially seated and forming thereafter a fixed stop for the first spring.

16. A device for controlling the flow of liquids, comprising a reservoir to receive the liquid, an inlet passage through which liquid flows into the reservoir, an upwardly facing valve seat in said passage, a cooperative, downwardly facing, reciprocable valve member, a spring urging the valve member to an upper, open position, a liquid level responsive element in said reservoir, a lever pivotally supported intermediate its ends, one end supporting said element, a downwardly acting, pressure applying member at the other end of the lever, pressure transmitting mechanism intermediate the valve member and pressure applying member effective when the liquid level responsive element moves up through a predetermined range of movement to close the passage, a second downwardly acting, pressure applying member carried by the lever between the pivot and the liquid level responsive element, and a second pressure transmitting mechanism between the valve member and the second pressure applying member effective to actuate the valve member to closed position during a predetermined lowering of the liquid level responsive element through a range of movement substantially lower than the upward closing movement.

17. A device such as claimed in claim 16, having a second upwardly facing valve seat in the inlet passage and below the first, and a second valve member having a lost motion connection with the first for closing the passage before the liquid level responsive element reaches either extreme position.

18. A device such as claimed in claim 16, wherein each of the pressure transmitting mechanisms includes a lever pivoted at one end and resting on the valve member.

19. A device such as claimed in claim 16, wherein the first pressure transmitting mechanism includes a lever pivoted at one end and resting on the valve member, the said lever having an upwardly inclined surface against which the pressure applying element is brought when the liquid rises through the first range of movement.

20. A device for controlling the flow of liquids, comprising a reservoir to receive the liquid, an inlet passage through which liquid flows into the reservoir, a drain for the reservoir, an upwardly facing valve seat in the passage, a cooperative, downwardly facing valve member, a spring urging the valve member to an upper, open position, a liquid level responsive mechanism including a lever pivoted on a horizontal axis above the top of the valve member and near the axis thereof and shiftable by change in liquid level in the reservoir, a pin carried by the lever between its pivot and the valve member axis and movable downwardly toward the valve member when the liquid level rises, a second pivoted lever having its free end resting on the valve member and an intermediate portion below and engageable with the pin, so that the valve member may be forced downwardly by reason of the liquid level responsive mechanism to compress the spring and bring the valve member against the seat, a second pin carried by the first lever on the other side of the lever axis and movable downwardly when the liquid level lowers, and a third pivoted lever supported by the valve member and engageable at the free end by the second pin to shift the valve member to closed position when the liquid level is substantially below the level at which the first pin closes the valve on rise of liquid level.

21. A device for controlling the flow of a liquid having a predetermined variation in density and viscosity with change in temperature, comprising a reservoir having an inlet valve, an outlet valve through which liquid drains, liquid level responsive mechanism for opening and closing the inlet valve to normally maintain a substantially constant liquid level, said mechanism and liquid being sensitive to temperature changes which tend to change the outlet valve flow rate with change of temperature, and means for imposing a variable load on the liquid level responsive mechanism to vary the level sufficiently to maintain a substantially constant flow rate independent of variations in liquid temperature, comprising a thermally responsive element having one end fixedly supported and the free end secured to the liquid level responsive mechanism.

22. A device for controlling the flow of a liquid having a predetermined variation in density and viscosity with change in temperature, comprising a reservoir having an inlet valve, an outlet valve through which liquid drains, liquid level responsive mechanism including a pressure multiplying leverage system of substantially inflexible parts for opening and closing the inlet valve to normally maintain a substantially constant liquid level, said mechanism and liquid being sensitive to temperature changes which tend to change the outlet valve flow rate with change of temperature, and a thermally responsive element for imposing a variable load on the liquid level responsive mechanism to vary the level sufficiently to maintain a substantially constant flow rate independent of variations in liquid temperature.

23. A device such as claimed in claim 22, wherein the thermally responsive element is bimetallic and substantially submerged in the liquid.

24. A device such as claimed in claim 22, wherein the thermally responsive element is resilient and bimetallic and substantially submerged in the liquid and having means to adjust the tension of said element.

25. In valve control means for liquid burners and the like, a fuel chamber, a fuel discharge line extending from said fuel chamber, means for controlling the flow of fuel therethrough, a fuel inlet line extending to said fuel chamber, a liquid level responsive mechanism in said chamber for opening and closing the inlet valve, and means responsive to changes in the temperature of the fuel for varying the response of said mechanism and for thereby varying the level of fuel in the fuel chamber necessary to shift the mechanism sufficiently to close said valve including a temperature responsive element having one end fixed and the other end movable in unison with the liquid level responsive mechanism.

26. A valve control means such as claimed in claim 25, wherein the thermally responsive element is resilient and bimetallic and having means for adjusting the tension of the element.

27. In valve control means for liquid burners and the like, a fuel chamber, a fuel discharge line extending from said fuel chamber, means for controlling the flow of fuel therethrough, a fuel inlet line extending to said fuel chamber, a liquid level responsive mechanism in said chamber for opening and closing the inlet valve, including a liquid displacement element and a lever at the end of which the liquid displacement element is secured, an actuating connection between said lever and said inlet valve, and means responsive to changes in the temperature of the fuel for varying the response of said mechanism and for thereby varying the level of fuel in the fuel chamber necessary to shift the mechanism sufficiently to close said valve including a temperature responsive element and a connection between said temperature responsive element and said lever.

28. In valve control means for liquid burners and the like, a fuel chamber, a fuel discharge line extending from said fuel chamber, means for controlling the flow of fuel therethrough, a fuel inlet line extending to said fuel chamber, a liquid level responsive mechanism in said chamber for opening and closing the inlet valve, including a liquid displacement element and a lever at the end of which the liquid displacement element is secured, an actuating connection between said lever and said inlet valve, and means responsive to changes in the temperature of the fuel for varying the response of said mechanism and for thereby varying the level of fuel in the fuel chamber necessary to shift the mechanism sufficiently to close said valve including a temperature responsive leaf connected to said lever and including a portion extending into the fuel in the fuel chamber.

RALPH W. DE LANCEY.